(12) United States Patent
Leboe et al.

(10) Patent No.: US 7,479,335 B2
(45) Date of Patent: Jan. 20, 2009

(54) ANODE HUMIDIFICATION

(75) Inventors: David A. Leboe, Vancouver (CA); Kenneth M. Flaherty, Delta (CA); Adrian J. Corless, New Westminster (CA); Kenneth W. Kratschmar, Vancouver (CA); John D. Usborne, Vancouver (CA)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 11/823,552

(22) Filed: Jun. 28, 2007

(65) Prior Publication Data
US 2008/0014475 A1    Jan. 17, 2008

Related U.S. Application Data
(60) Provisional application No. 60/806,148, filed on Jun. 29, 2006.

(51) Int. Cl.
  *H01M 8/04* (2006.01)
  *H01M 8/10* (2006.01)
  *H01M 8/00* (2006.01)
(52) U.S. Cl. ............... 429/13; 429/26; 429/30
(58) Field of Classification Search ............ 429/13, 429/26, 30
See application file for complete search history.

(56) References Cited

U.S. PATENT DOCUMENTS

| | | | |
|---|---|---|---|
| 5,773,160 A * | 6/1998 | Wilkinson et al. | 429/13 |
| 6,376,111 B1 | 4/2002 | Mathias et al. | 429/13 |
| 6,497,970 B1 | 12/2002 | Fronk | 429/12 |
| 6,524,733 B1 | 2/2003 | Nonobe | 429/13 |
| 6,562,501 B1 | 5/2003 | Nagamiya et al. | 429/25 |
| 6,706,429 B1 | 3/2004 | Frank et al. | 429/13 |
| 6,746,789 B1 | 6/2004 | Chen et al. | 429/19 |
| 6,783,878 B2 * | 8/2004 | Voss et al. | 429/17 |
| 6,821,660 B2 | 11/2004 | Andrews | 429/13 |
| 6,869,709 B2 * | 3/2005 | Shimotori et al. | 429/25 |
| 2003/0104261 A1 | 6/2003 | Schnitzer et al. | |
| 2007/0128479 A1 | 6/2007 | Gutenmann | |

* cited by examiner

*Primary Examiner*—Patrick Ryan
*Assistant Examiner*—Angela J. Martin
(74) *Attorney, Agent, or Firm*—Trop, Pruner & Hu, P.C.

(57) ABSTRACT

A technique includes providing fuel and oxidant flows to a fuel cell. The technique includes humidifying the anode of the fuel cell, including saturating the oxidant flow and maintaining a temperature of the oxidant flow above a temperature of the fuel cell such that excess water propagates from a cathode of the fuel cell to the anode.

14 Claims, 2 Drawing Sheets

ANODE HUMIDIFICATION

This application claims the benefit under 35 U.S.C. § 119 (e) to U.S. Provisional Patent Application Ser. No. 60/806,148, entitled, "ANODE HUMIDIFICATION THROUGH CATHODE OVERSATURATION," which was filed on Jun. 29, 2006, and is hereby incorporated by reference in its entirety.

BACKGROUND

The invention generally relates to anode humidification.

A fuel cell is an electrochemical device that converts chemical energy directly into electrical energy. There are many different types of fuel cells, such as a solid oxide fuel cell (SOFC), a molten carbonate fuel cell, a phosphoric acid fuel cell, a methanol fuel cell and a proton exchange membrane (PEM) fuel cell.

As a more specific example, a PEM fuel cell includes a PEM membrane, which permits only protons to pass between an anode and a cathode of the fuel cell. A typical PEM fuel cell may employ polysulfonic-acid-based ionomers and operate in the 50° Celsius (C.) to 75° temperature range. Another type of PEM fuel cell may employ a phosphoric-acid-based polybenziamidazole (PBI) membrane that operates in the 150° to 200° temperature range.

At the anode of the PEM fuel cell, diatomic hydrogen (a fuel) ionizes to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

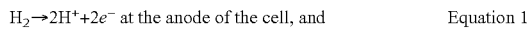
$$H_2 \rightarrow 2H^+ + 2e^- \text{ at the anode of the cell, and} \qquad \text{Equation 1}$$

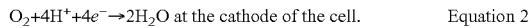
$$O_2 + 4H^+ + 4e^- \rightarrow 2H_2O \text{ at the cathode of the cell.} \qquad \text{Equation 2}$$

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Catalyzed electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

SUMMARY

In an embodiment of the invention, a technique includes providing fuel and oxidant flows to a fuel cell. The technique includes humidifying the anode of the fuel cell, including saturating the oxidant flow and maintaining a temperature of the oxidant flow above a temperature of the fuel cell such that excess water propagates from a cathode of the fuel cell to the anode.

In another embodiment of the invention, a system includes a fuel cell stack, a fuel source, an oxidant source and a humidifier. The fuel cell stack includes an anode chamber and a cathode chamber. The fuel source provides a fuel flow, and the oxidant source provides an oxidant flow. The humidifier saturates the oxidant flow and maintains a temperature of the oxidant flow above a temperature of the fuel cell stack to produce excess water that propagates from the cathode chamber to the anode chamber to at least partially humidify the anode chamber.

Advantages and other features of the invention will become apparent from the following drawing, description and claims.

DETAILED DESCRIPTION

Figure 1:
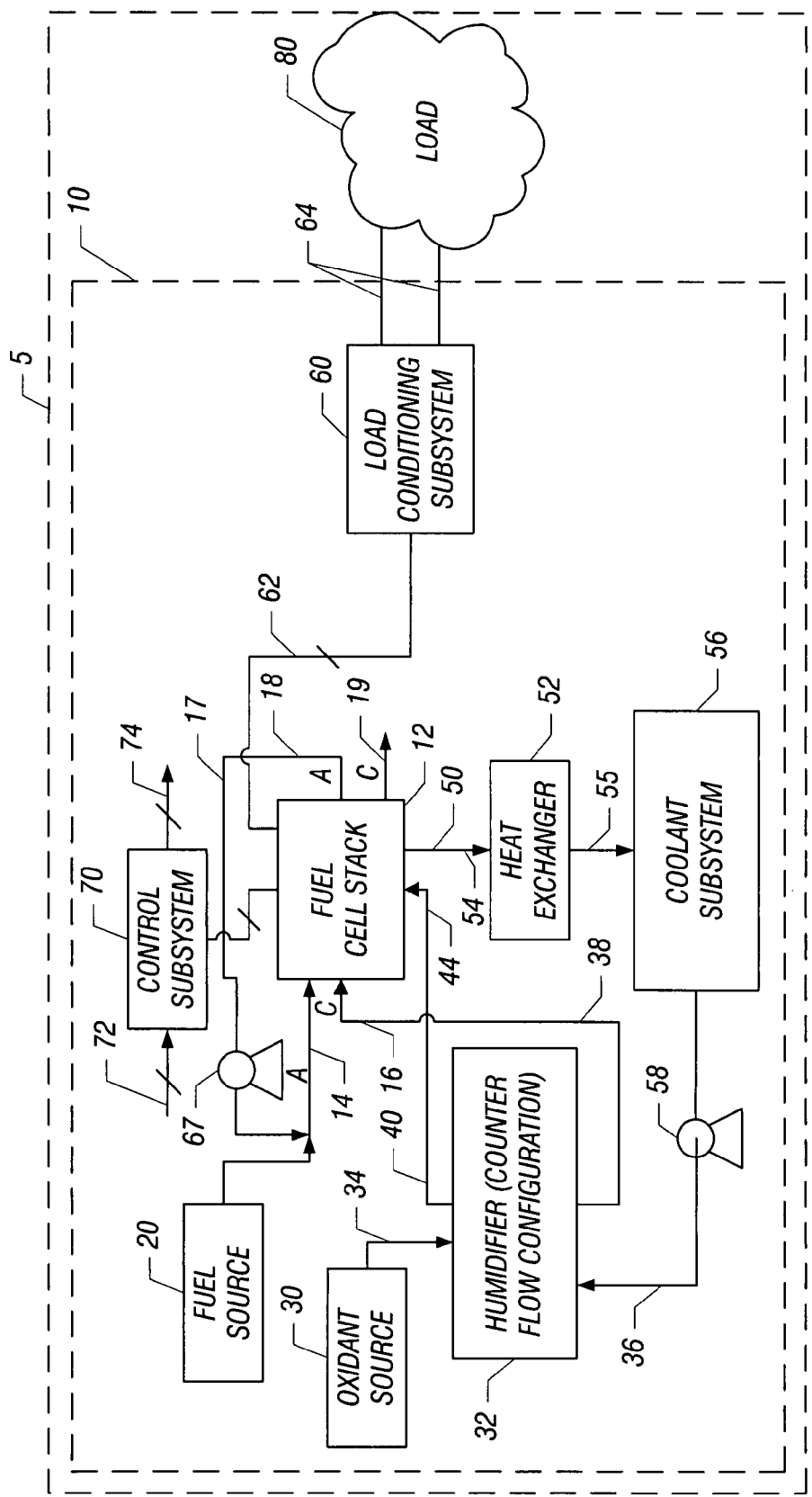
FIG. 1 is a schematic diagram of a system according to an embodiment of the invention.

Referring to FIG. 1, an embodiment 10 of a fuel cell-based system in accordance with the invention includes a fuel cell stack 12, which produces electrical power for an external load 80 (a commercial load, a residential load, power consuming components of an automobile, etc., depending on the particular embodiment of the invention). More specifically, the fuel cell stack 12 includes an anode chamber, which receives an incoming fuel flow at its anode inlet 14 from a fuel source 20. The fuel source 20 may be, as examples, a stored hydrogen source, a reformer that converts a hydrocarbon into a reformate flow, etc. The incoming fuel flows through the flow channels of the anode chamber of the fuel cell stack and exits the stack 12 at an anode outlet 18. It is noted that in accordance with other embodiments of the invention, the fuel cell stack 12 may not have a continuous outlet for the anode chamber and thus, may be "dead-ended," or "dead-headed."

The fuel cell stack 12 includes a cathode inlet 16, which receives an incoming oxidant flow that is generated by an oxidant source 30 (an air blower or compressor, as examples). The oxidant flow that is received at the cathode inlet 16 is communicated through the cathode chamber of the fuel cell stack 12. In this regard, the oxidant flow flows through the oxidant flow channels of the fuel cell stack 12 for purposes of promoting electrochemical reactions inside the fuel cell stack 12 in combination with the above-described fuel flow in the anode chamber. It is noted that the oxidant and fuel flows may flow in the same direction in the fuel cell stack 12, and thus, may be considered to co-flow with each other inside the fuel cell stack 12. The oxidant flow exits the fuel cell stack 12 at a cathode outlet 19. The system 10 may include a flare or oxidizer to combust any remaining hazardous gas from the cathode exhaust flow 19, in accordance with some embodiments of the invention.

In accordance with some embodiments of the invention, the system 10 and load 80 may be portable, or mobile, and more particularly may be (as an example) part of a motor vehicle 5 (a car, truck, airplane, etc.). Thus, the system 10 may serve as at least part of the power plant of the vehicle. In other embodiments of the invention, the system 10 and load 80 may be part of a stationary system. For example, the system 10 may supply all or part of the power needs of a house, electrical substation, backup power system, etc. Additionally, the system 10 may supply thermal energy to a thermal energy consuming load (water heater, water tank, heat exchanger, etc.), and thus, electrical as well as thermal loads to the system are also envisioned. Therefore, many different applications of the system and loads that consume energy from the system are contemplated and are within the scope of the appended claims.

It is typically desirable for the anode and cathode chambers of the fuel cell stack 12 to contain a proper amount of moisture in order that the membrane electrode assemblies (MEAs) of the stack 12 do not dry out. In accordance with embodiments of the invention described herein, the system 10 does not employ an anode humidifier for purposes of saving system balance of plant (BOP) cost and complexity. For purposes of humidifying the anode chamber, the system 10 re-circulates the anode exhaust (appearing at the anode exhaust outlet 18) back to the anode inlet 14 to significantly increase the humidity of the relatively dry incoming fuel flow from the fuel source 20. As depicted in FIG. 1, in accordance with some embodiments of the invention, the anode re-circulation may be accomplished via a re-circulation communication line 17 and a re-circulation device 67 (an ejector, pump, blower, etc.). However, other variations are contemplated.

The relative percent humidity in the incoming fuel flow to the fuel cell stack 12 at the anode inlet 14 varies with the fuel flow rates from the anode re-circulation path and the fuel source 20, but it may reach, as an example, a maximum humidification of approximately seventy to seventy-five percent. Although this arrangement significantly humidifies the anode chamber, in accordance with some embodiments of the invention, the humidification needs to be significantly higher, such as ninety-five percent (as an example) for purposes of eliminating or preventing drying effects in the stack 12 near the anode inlet 14. It is noted that if the incoming fuel flow is under-humidified, the resultant drying may result in transfer leaks over time.

In accordance with embodiments of the invention described herein, for purposes of supplementing the humidification that is provided by the anode re-circulation path, the system 10 includes a humidifier 32, which humidifies the incoming oxidant flow to the fuel cell stack 12 and sufficiently saturates the oxidant flow so that excess moisture propagates from the cathode chamber to the anode chamber to supplement the humidification of the anode.

More specifically, the humidifier 32 has an inlet 34, which receives an incoming oxidant flow from an oxidant source 30. The humidifier 32 humidifies the flow from the oxidant source 30, to produce a saturated oxidant flow, which appears at an outlet 38 of the humidifier 32 and has a higher temperature than the coolant flow when entering the fuel cell stack 12. The saturated oxidant flow is routed to the cathode inlet 16 of the fuel cell stack 12. After the oxidant flow enters the fuel cell stack 12 (which is regulated to a slightly cooler temperature (a few degrees Celsius (C.), for example) due to the coolant flow), some of the water condenses out of the oxidant flow to produce excess water that propagates across the MEAs and supplements the humidification of the anode.

Turning now to the more specific details, in accordance with some embodiments of the invention, the humidifier 32 is placed in a liquid-gas counterflow configuration, in which the incoming oxidant flow is humidified by a liquid stream, which supplies enthalpy and liquid water. In accordance with some embodiments of the invention, the liquid stream may be a coolant flow (water, for example), which is circulated through the fuel cell stack 12 for purposes of regulating the stack's temperature. More specifically, in accordance with some embodiments of the invention, the coolant and oxidant flows may be communicated through the humidifier 32 in a counterflow arrangement, which causes the temperature of the oxidant flow at the fuel cell cathode inlet 16 to be a few degrees above, (for example) the inlet coolant temperature of the fuel cell stack 12. More specifically, because enthalpy is drawn from the liquid in the humidifier 32, the exiting liquid has a slightly lower temperature than the water inlet temperature (i.e., coolant inlet temperature) of the humidifier 32, and thus, the oxidant flow that exits the humidifier 32 has a slightly higher temperature than the incoming coolant flow to the fuel cell stack 12. This results in an immediate excess of moisture in the cathode chamber at the cathode inlet 16, which propagates through the MEAs to the anode chamber, which is running in a co-flow configuration (i.e., the anode and oxidant flows in the stack 12 are generally flowing in the same direction), to humidify the otherwise underhumidified region at the anode inlet 14. The high exhaust temperature of the fuel cell stack 12, in accordance with some embodiments of the invention, is further utilized to match the reactant inlet conditions and achieve the highest possible anode inlet conditions without a dedicated anode humidifier.

In accordance with some embodiments of the invention, the humidifier 32 receives at a liquid inlet 36, a coolant flow (a water flow, for example), which is provided by a coolant pump 58. The coolant pump 58 is in communication with a coolant reservoir 56, which serves as a sump and receives coolant that has been circulated through the fuel cell stack 12. More specifically, a heat exchanger 52 has an inlet 54, which is connected to a coolant outlet 50 of the fuel cell stack 12. The heat exchanger 52, in general, transfers thermal energy from the coolant that is provided by the fuel cell stack 12 for purposes of cooling the coolant flow for its return trip through the coolant channels of the fuel cell stack 12. Thus, the coolant flow, which is provided by the coolant pump 58, flows through the humidifier 32 and exits the humidifier 32, where the coolant flow is directed into a coolant inlet 44 of the fuel cell stack 12.

It is noted that the humidifier 32 as well as the associated coolant system are described herein as a particular example. Other embodiments are contemplated and are within the scope of the appended claims. For example, in accordance with other embodiments of the invention, the humidifier 32 may use a liquid stream other than the coolant stack. Other types of humidifiers are possible, in accordance with other embodiments of the invention.

Figure 2:
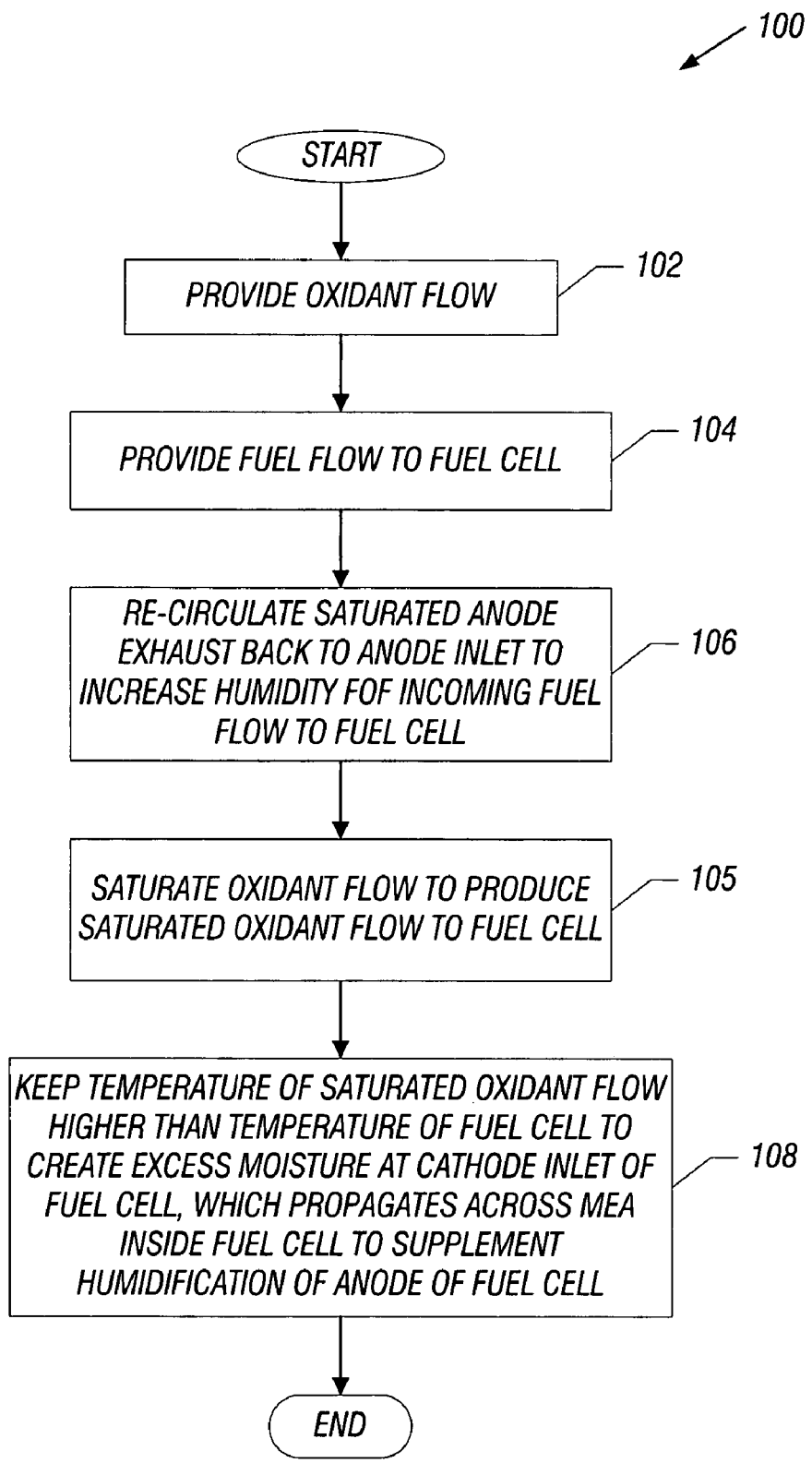
FIG. 2 is a flow diagram depicting a technique to humidify an anode of a fuel cell according to an embodiment of the invention.

Referring to FIG. 2, to summarize, a technique 100 in accordance with embodiments of the invention may be used to humidify the anode of a fuel cell. The technique 100 includes providing (block 102) an oxidant flow and providing (block 104) a fuel flow to a fuel cell. The fuel cell produces a saturated anode exhaust flow, and the technique 100 includes re-circulating the saturated anode exhaust flow back to the anode inlet of the fuel cell to increase the humidity of the incoming fuel flow to the fuel cell, pursuant to block 105. The oxidant flow is saturated (block 106) to produce a saturated oxidant flow to the fuel cell. The temperature of the saturated oxidant flow is kept higher (block 108) than the temperature of the fuel cell to create excess moisture at the cathode inlet of the fuel cell for purposes of supplementing humidification of the anode of the fuel cell, as described herein.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
providing a fuel flow to a fuel cell;
providing a oxidant flow to the fuel cell; and
humidifying an anode of the fuel cell, comprising saturating the oxidant flow and maintaining a temperature of the oxidant flow above a temperature of the fuel cell such that excess water propagates from a cathode of the fuel cell to the anode.

2. The method of claim 1, wherein the excess water propagates across a membrane electrode assembly of the fuel cell.

3. The method of claim 1, further comprising:
flowing a coolant through the fuel cell to regulate a temperature of the cell; and
using the coolant to humidify the oxidant flow prior to the oxidant flow entering the fuel cell.

4. The method of claim 3, further comprising:
counter flowing the coolant and the oxidant flow during humidification of the oxidant flow.

5. The method of claim 1, further comprising:
co-flowing the oxidant flow and the fuel flow in the fuel cell.

6. The method of claim 1, further comprising:
re-circulating an anode exhaust from the fuel cell back to an anode inlet of the fuel cell to partially humidify the anode.

7. A system comprising:
a fuel cell stack comprising a cathode chamber and an anode chamber;
a fuel source to provide a fuel flow;
an oxidant source to provide an oxidant flow; and
a humidifier to saturate the oxidant flow and maintain a temperature of the oxidant flow above a temperature of the fuel cell stack such that excess water propagates from the cathode chamber to the anode chamber to at least partially humidify the anode chamber.

8. The system of claim 7, further comprising:
membrane electrode assemblies separating the cathode chamber from the anode chamber, wherein
the excess water propagates across membrane electrode assemblies to increase humidity in the anode chamber.

9. The system of claim 7, further comprising:
a coolant subsystem to produce a coolant flow to regulate a temperature of the fuel cell stack, wherein
the humidifier is adapted to use the coolant flow to humidify the oxidant flow.

10. The system of claim 9, wherein the humidifier is adapted to counter flow the coolant flow and the oxidant flow inside the humidifier.

11. The system of claim 10, wherein the counter flow of the coolant and oxidant flows inside the humidifier results in the oxidant flow leaving the humidifier at a slightly higher temperature than the coolant flow leaves the humidifier.

12. The system of claim 7, wherein the fuel cell stack is adapted to co-flow the oxidant flow and the fuel flow inside the fuel cell stack.

13. The system of claim 7, wherein the fuel cell system does not humidify the fuel flow before the fuel flow enters the fuel cell stack.

14. The system of claim 7, further comprising:
a motor vehicle,
wherein the fuel cell stack, fuel source, oxidant source and humidifier are part of the vehicle.

* * * * *